(12) United States Patent
Polineni et al.

(10) Patent No.: US 11,484,035 B2
(45) Date of Patent: Nov. 1, 2022

(54) SYNERGISTIC COMPOSITION OF A NEMATICIDE

(71) Applicant: TELLURIS BIOTECH INDIA PRIVATE LIMITED, Telangana (IN)

(72) Inventors: Venu Polineni, Telangana (IN); Alejandro Calderón Urrea, Fresno, CA (US); Glenda W. Polack, Fresno, CA (US)

(73) Assignee: TELLURIS BIOTECH INDIA PRIVATE LIMITED, Telangana (IN)

(*) Notice: Subject to any disclaimer, the term of this patent is extended or adjusted under 35 U.S.C. 154(b) by 0 days.

(21) Appl. No.: 16/495,008

(22) PCT Filed: Mar. 17, 2018

(86) PCT No.: PCT/IB2018/051783
§ 371 (c)(1),
(2) Date: Sep. 17, 2019

(87) PCT Pub. No.: WO2018/167733
PCT Pub. Date: Sep. 20, 2018

(65) Prior Publication Data
US 2020/0281212 A1   Sep. 10, 2020

(30) Foreign Application Priority Data
Mar. 17, 2017  (IN) .............................. 201741009365

(51) Int. Cl.
*A01N 63/12* (2020.01)
(52) U.S. Cl.
CPC .................................... *A01N 63/12* (2020.01)
(58) Field of Classification Search
None
See application file for complete search history.

(56) References Cited

U.S. PATENT DOCUMENTS

| 7,071,302 | B1 | 7/2006 | Horvitz et al. | |
| 9,125,413 | B1* | 9/2015 | Calderon-Urrea | ....... C07K 7/06 |
| 10,925,286 | B2* | 2/2021 | Polineni | ................. A01N 63/50 |
| 2001/0019728 | A1* | 9/2001 | Basinger | ................ A01N 59/12 |
| | | | | 424/667 |
| 2006/0106200 | A1 | 5/2006 | Shi | |

FOREIGN PATENT DOCUMENTS

WO    WO 01/00840    *   1/2001

OTHER PUBLICATIONS

USCS (downloaded on Oct. 9, 2020 from URL:<https://www.americanchemicalsuppliers.com/list/search?search=sodium+phosphate+monobasic) (Year: 2020).*
PCT/IB2018/051783 International Search Report dated Sep. 18, 2018.
PCT/IB2018/051783 Written Opinion completed Aug. 27, 2018.
Huang et al. "Mechanistic insights into CED-4-mediated activation of CED-3", Genes & Development 27:2039-2048 (2013).
Colby, S. R. "Calculating synergistic and antagonistic responses of herbicide combinations." Weeds 15.1: 20-22 (1967).
Richer, D.L. "Synergism—a Patent View" Pestic. Sci., 19, 309-315 (1987).

* cited by examiner

*Primary Examiner* — Sergio Coffa
(74) *Attorney, Agent, or Firm* — Venable LLP; Keith G. Haddaway

(57) ABSTRACT

The present invention provides a synergistic composition of a nematicide comprising of a nematicidal peptides derived from CED-4 protein sequence comprising of at least two peptides. The nematicidal peptides individually show 100% nematicidal activity at a concentration of 1 mg/ml, whereas, the combination of at least two peptides in a ratio of 1:1 shows 100% nematicidal activity at concentration as low as 0.8 mg/ml bringing a synergistic effect. This synergistic nematicidal composition is highly economical as it requires 20% less peptide concentration for 100% activity, moreover the composition is environmentally safe and non-toxic to humans and animals.

11 Claims, 1 Drawing Sheet
Specification includes a Sequence Listing.

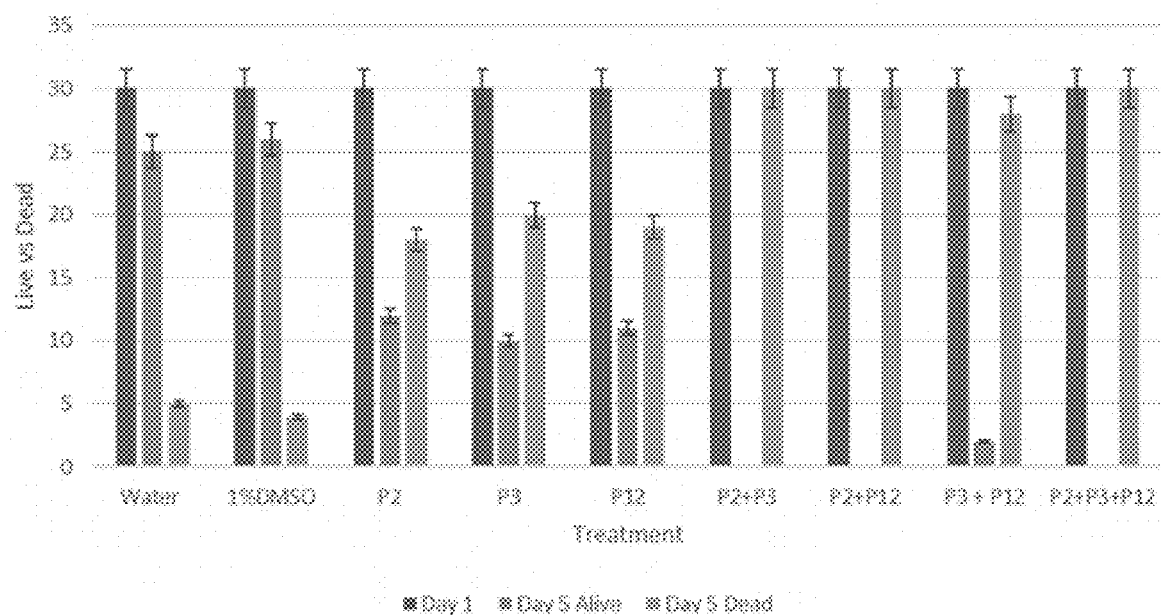

SEQUENCE LISTING

<160> NUMBER OF SEQ ID NOS: 4

<210> SEQ ID NO 1
<211> LENGTH: 549
<212> TYPE: PRT
<213> ORGANISM: Caenorhabditis elegans

<400> SEQUENCE: 1

```
Met Leu Cys Glu Ile Glu Cys Arg Ala Leu Ser Thr Ala His Thr Arg
1               5                   10                  15

Leu Ile His Asp Phe Glu Pro Arg Asp Ala Leu Thr Tyr Leu Glu Gly
            20                  25                  30

Lys Asn Ile Phe Thr Glu Asp His Ser Glu Leu Ile Ser Lys Met Ser
        35                  40                  45

Thr Arg Leu Glu Arg Ile Ala Asn Phe Leu Arg Ile Tyr Arg Arg Gln
    50                  55                  60

Ala Ser Glu Leu Gly Pro Leu Ile Asp Phe Phe Asn Tyr Asn Asn Gln
65                  70                  75                  80

Ser His Leu Ala Asp Phe Leu Glu Asp Tyr Ile Asp Phe Ala Ile Asn
            85                  90                  95

Glu Pro Asp Leu Leu Arg Pro Val Val Ile Ala Pro Gln Phe Ser Arg
            100                 105                 110

Gln Met Leu Asp Arg Lys Leu Leu Leu Gly Asn Val Pro Lys Gln Met
        115                 120                 125

Thr Cys Tyr Ile Arg Glu Tyr His Val Asp Arg Val Ile Lys Lys Leu
    130                 135                 140

Asp Glu Met Cys Asp Leu Asp Ser Phe Phe Leu Phe Leu His Gly Arg
145                 150                 155                 160

Ala Gly Ser Gly Lys Ser Val Ile Ala Ser Gln Ala Leu Ser Lys Ser
            165                 170                 175

Asp Gln Leu Ile Gly Ile Asn Tyr Asp Ser Ile Val Trp Leu Lys Asp
            180                 185                 190

Ser Gly Thr Ala Pro Lys Ser Thr Phe Asp Leu Phe Thr Asp Ile Leu
        195                 200                 205

Leu Met Leu Lys Ser Glu Asp Asp Leu Leu Asn Phe Pro Ser Val Glu
    210                 215                 220

His Val Thr Ser Val Val Leu Lys Arg Met Ile Cys Asn Ala Leu Ile
```

-continued

```
               225                 230                 235                 240
       Asp Arg Pro Asn Thr Leu Phe Val Phe Asp Val Val Gln Glu Glu
                       245                 250                 255

Thr Ile Arg Trp Ala Gln Glu Leu Arg Leu Arg Cys Leu Val Thr Thr
                       260                 265                 270

Arg Asp Val Glu Ile Ser Asn Ala Ala Ser Gln Thr Cys Glu Phe Ile
                       275                 280                 285

Glu Val Thr Ser Leu Glu Ile Asp Glu Cys Tyr Asp Phe Leu Glu Ala
                       290                 295                 300

Tyr Gly Met Pro Met Pro Val Gly Glu Lys Glu Asp Val Leu Asn
       305                 310                 315                 320

Lys Thr Ile Glu Leu Ser Ser Gly Asn Pro Ala Thr Leu Met Met Phe
                       325                 330                 335

Phe Lys Ser Cys Glu Pro Lys Thr Phe Glu Lys Met Ala Gln Leu Asn
                       340                 345                 350

Asn Lys Leu Glu Ser Arg Gly Leu Val Gly Val Glu Cys Ile Thr Pro
                       355                 360                 365

Tyr Ser Tyr Lys Ser Leu Ala Met Ala Leu Gln Arg Cys Val Glu Val
                       370                 375                 380

Leu Ser Asp Glu Asp Arg Ser Ala Leu Ala Phe Ala Val Val Met Pro
       385                 390                 395                 400

Pro Gly Val Asp Ile Pro Val Lys Leu Trp Ser Cys Val Ile Pro Val
                       405                 410                 415

Asp Ile Cys Ser Asn Glu Glu Glu Leu Asp Asp Glu Val Ala Asp
                       420                 425                 430

Arg Leu Lys Arg Leu Ser Lys Arg Gly Ala Leu Leu Ser Gly Lys Arg
                       435                 440                 445

Met Pro Val Leu Thr Phe Lys Ile Asp His Ile His Met Phe Leu
                       450                 455                 460

Lys His Val Val Asp Ala Gln Thr Ile Ala Asn Gly Ile Ser Ile Leu
       465                 470                 475                 480

Glu Gln Arg Leu Leu Glu Ile Gly Asn Asn Asn Val Ser Val Pro Glu
                       485                 490                 495

Arg His Ile Pro Ser His Phe Gln Lys Phe Arg Arg Ser Ser Ala Ser
                       500                 505                 510

Glu Met Tyr Pro Lys Thr Thr Glu Glu Thr Val Ile Arg Pro Glu Asp
                       515                 520                 525

Phe Pro Lys Phe Met Gln Leu His Gln Lys Tyr Asp Ser Leu Lys
                       530                 535                 540

Asn Phe Ala Cys Cys
       545

<210> SEQ ID NO 2
<211> LENGTH: 15
<212> TYPE: PRT
<213> ORGANISM: Caenorhabditis elegans

<400> SEQUENCE: 2

Asp Leu Leu Arg Pro Val Val Ile Ala Pro Gln Phe Ser Arg Gln
1               5                   10                  15

<210> SEQ ID NO 3
<211> LENGTH: 19
<212> TYPE: PRT
<213> ORGANISM: Caenorhabditis elegans
```

```
<400> SEQUENCE: 3

Arg Gln Met Leu Asp Arg Lys Leu Leu Leu Gly Asn Val Pro Lys Gln
1               5                   10                  15

Met Thr Cys

<210> SEQ ID NO 4
<211> LENGTH: 12
<212> TYPE: PRT
<213> ORGANISM: Caenorhabditis elegans

<400> SEQUENCE: 4

Phe Pro Lys Phe Met Gln Leu His Gln Lys Phe Tyr
1               5                   10
```

SYNERGISTIC COMPOSITION OF A NEMATICIDE

FIELD OF THE INVENTION

The present invention relates to nematicides, which are compositions used in agricultural field for killing plant parasites, specifically nematodes. More particularly, the invention relates to a synergistic composition of a nematicide comprising a nematicidal peptides derived from CED-4 protein.

BACKGROUND OF THE INVENTION

Nematodes are a major threat to the agricultural industry as they cause heavy losses to the yield, thereby, affecting the economy in a significant way. Nematodes are second to insects which are known to cause serious damage to crops such as tomatoes and other vegetables, citrus fruits, potatoes, rice, coconuts, wheat and other cereals, ornamental plants and others. Nematodes alone or in combination with other soil microorganisms have been found to attack almost every part of the plant including roots, stems, leaves, fruits and seeds. They cause a projected yield loss of 12.3% ($157 billion dollars) worldwide. Out of which $40.3 million is reported from India (Singh et al., 2015).

Root-knot nematodes which belong to the *Meloidogyne* genus are one of the three most economically damaging genera of plant-parasitic nematodes on horticultural and field crops. They are obligate parasites of the roots of several plants; and *Meloidogyne incognita* is amongst the major pest worldwide.

Nematicides are compositions which are used to kill these plant parasites, the nematodes. Most of the nematicides used are chemical compositions which are highly toxic to humans and are also detrimental to useful soil bacteria. Several nematicides have also shown to contaminate groundwater, and cause depletion of the ozone layer. One of the well-known nematicide, methyl-bromide, has been banned in several countries including USA and India. Another highly toxic nematicide which is widely used in field crops is carbofuran; a single grain of carbofuran can kill birds within few minutes. Nematicides such as phorate can easily go through the soil into the groundwater and contaminate it.

The severe drawbacks associated with chemical nematicides necessitate the development of novel technologies for controlling nematodes. One such method is generating transgenic plant lines which express the transgenic genes for resistance against nematodes. However, this is time consuming and expensive method which requires extensive prior research activities. In many countries including India, there is fierce objection to introduction of transgenic lines based on several moral, ethical and unseen environmental issues.

One effective method involves generation of compositions of nematicides which are environmentally safe, non-toxic, and easy to generate and use.

U.S. Pat. No. 9,125,413B1 describes peptides derived from *Caenorhabditis elegance* CED-4 protein which show potent nematicidal activity. CED-4 protein consisting of amino acids of SEQ ID NO. 1, belongs to the family of apoptosis proteins. The SEQ ID NO. 1 comprises:

MLCEIECRALSTAHTRLIHDFEPRDALTYLEGKNIFTEDHSELISKMSTR

LERIANFLRIYRRQASELGPLIDFFNYNNQSHLADFLEDYIDFAINEPDL

-continued

LRPVVIAPQFSRQMLDRKLLLGNVPKQMTCYIREYHVDRVIKKLDEMCDL

DSFFLFLHGRAGSGKSVIASQALSKSDQLIGINYDSIVWLKDSGTAPKST

FDLFTDILLMLKSEDDLLNFPSVEHVTSVVLKRMICNALIDRPNTLFVFD

DVVQEETIRWAQELRLRCLVTTRDVEISNAASQTCEFIEVTSLEIDECYD

FLEAYGMPMPVGEKEEDVLNKTIELSSGNPATLMMFFKSCEPKTFEKMAQ

LNNKLESRGLVGVECITPYSYKSLAMALQRCVEVLSDEDRSALAFAVVMP

PGVDIPVKLWSCVIPVDICSNEEEQLDDEVADRLKRLSKRGALLSGKRMP

VLTFKIDHIIHMFLKHVVDAQTIANGISILEQRLLEIGNNNVSVPERHIP

SHFQKFRRSSASEMYPKTTEETVIRPEDFPKFMQLHQKFYDSLKNFACC.

Three peptides derived from SEQ ID NO. 1 were shown to have nematicidal activity at effective concentrations of about 1 mg/ml, the peptides comprising of the following sequences:

1) Peptide 2 consisting of 15 amino acids DLLRPVVIAPQFSRQ (99-113 amino acid stretch, SEQ ID NO. 2),
2) Peptide 3 consisting of 19 amino acids RQMLDRKLLLGNVPKQMTC (112-130 amino acid stretch, SEQ ID NO. 3), and
3) Peptide 12 consisting of 12 amino acids FPKFMQLHQKFY (529-540 amino acid stretch, SEQ ID NO. 4).

However, synthesis of peptides is an expensive technique; and to make a composition cost-effective one needs reduce the cost of production. Generally, the cost of synthesis of 50 mg of peptides in the range of 10-20 amino acids lies in the range of INR 25,000-30,000 and US $240-250. It is, therefore, important to make compositions with reduced cost of production.

The present invention takes into account the drawbacks of prior art and provides a method for controlling nematodes using anti-parasitic peptides, which are non-toxic and environmentally safe.

OBJECT OF THE INVENTION

Accordingly, the main object of the invention is to provide a composition of a nematicide comprising nematicidal peptides.

Another object of the invention is to provide a synergistic nematicidal composition comprising of at least two peptides derived from CED-4 protein of SEQ ID NO. 1 wherein the peptide consisting amino acid sequences of:

a.
                              (SEQ ID NO. 2)
DLLRPVVIAPQFSRQ, b.
                              (SEQ ID NO. 3)
RQMLDRKLLLGNVPKQMTC,
and c.
                              (SEQ ID NO. 4)
FPKFMQLHQKFY.

Yet another object of the invention is to provide a synergistic nematicidal composition which shows nematicidal activity, wherein the concentration of the peptides is less than 1 mg/ml.

Yet another object of the invention is to provide a synergistic nematicidal composition with reduced cost of production.

Yet another object of the invention is to provide a synergistic nematicidal composition which is non-toxic to humans.

Yet another object of the invention is to provide synergistic nematicidal composition which does not have broad-spectrum activity and is not detrimental to soil microorganisms.

Yet another object of the invention is to provide synergistic nematicidal composition which is easy to synthesize, does not require generation of transgenic plants, and is highly economical.

SUMMARY OF THE INVENTION

The present invention relates to a composition of a nematicide used in agricultural purposes for killing of plant parasites, specifically nematodes. More particularly, the invention relates to a synergistic composition of a nematicide comprising nematicidal peptides.

In the main embodiment of the invention the invention provides a composition of the nematicide comprising of peptides derived from CED-4 protein of SEQ ID NO. 1.

More specifically, the composition comprises of a synergistic combination of at least two peptides consisting of amino sequences:

a. DLLRPVVIAPQFSRQ (SEQ ID NO. 2), peptide 2 comprising of 15 amino acids,
b. RQMLDRKLLLGNVPKQMTC (SEQ ID NO. 3), peptide 3 comprising of 19 amino acids, and
c. FPKFMQLHQKFY (SEQ ID NO. 4), peptide 12 comprising of amino acids.

The peptides individually show 100% nematicidal activity at concentrations as low as 1 mg/ml.

However, the combination of at least two peptides acts in a synergistic manner and reduces the concentration of each of the peptides to 0.4 mg/ml for 100% nematicidal activity. Significant reduction in the amount of peptide required for activity greatly reduces the cost of production, thereby making the unique composition highly economical.

BRIEF DESCRIPTION OF DRAWINGS

FIG. 1 depicts a graph showing the effect of treatment of mixture comprising of Peptide 2 and Peptide 3; Peptide 2 and Peptide 12; Peptide 3 and Peptide 12; and Peptide 2, 3, and 12 against nematodes in 96-well plates.

DETAILED DESCRIPTION OF THE INVENTION

The present invention will now be described more fully hereinafter. This invention may, however, be embodied in many different forms and should not be construed as being limited to the embodiment set forth herein. Rather, the embodiment is provided so that this disclosure will be thorough, and will fully convey the scope of the invention to those skilled in the art.

The present invention relates to a synergistic composition which has ability to kill plant parasites, specifically, nematodes. More specifically, the present invention relates to a synergistic composition of a nematicide comprising of a nematicidal peptides, wherein, the peptides are from the CED-4 protein sequence.

In the main embodiment of the present invention, the invention provides a synergistic composition of a nematicide comprising of at least two peptides derived from CED-4 protein of SEQ ID No. 1. More specifically, the composition comprises of combination of the following peptides:

a. Peptide 2, a 15 amino acids long peptide comprising of the sequence DLLRPVVIAPQFSRQ (SEQ ID NO. 2),
b. Peptide 3, a 19 amino acid long comprising of the sequence RQMLDRKLLLGNVPKQMTC (SEQ ID NO. 3), and
c. Peptide 12, a 12 amino acids long comprising of the sequence FPKFMQLHQKFY (SEQ ID NO. 4).

At least two peptides containing amino acids of SEQ ID NO. 2-4 in a ratio of 1:1 acts as a highly potent nematicide showing 100% nematicidal activity at total peptide concentrations as low as 0.8 mg/ml. The combination of two peptides brings a synergistic effect and the combination works at a lower concentration compared to individual peptides alone. The synergistic composition reduced 20% of requirement of total peptide concentration, thereby making the invention highly economical, moreover the composition is environmentally safer than the other existing methods and easier than generation of transgenic lines with nematicidal activities.

Example 1—Procedures Involved

A) *M. incognita* Propagation

Tomato plants were inoculated with *M. incognita* juveniles and maintained in a growth chamber. After at least two months, the *M. incognita* eggs were extracted from the roots for experiments. The procedure followed for extracting *M. incognita* eggs is explained below.

The root tissues were either chopped by hand using a surgical blade and a watch glass, or it was chopped up using a food processor. The chopped tissue was then placed in a bottle and washed with a 10% dilution of bleach. Under sterile conditions, the root solution was then poured through sieves (60 count sieve on top, 500 count sieve on the bottom). The crude egg collection was collected from the bottom of the 500 count sieve into 5 mL each of bleach and egg mixture in 15 mL Falcon tubes. 5 mL of 70% sucrose solution was then placed in each Falcon tube. A 1 mL layer of double distilled sterile water was then gently placed on top of the sucrose mixtures in each Falcon tube. The samples were then centrifuged for 5 minutes at 1200 rpm. The embryos that were suspended between the sucrose solution and the 1 mL water layer were collected in a total of 3 mL (top layer of 3 mL of the solution) from each Falcon tube into fresh 15 mL Falcon tubes. 10 mL of a 5% bleach solution was added and the eggs were vortexed for 10 minutes. The Falcon tubes were then centrifuged for 5 minutes at 2000 rpm. The supernatant was then removed, and the eggs were rinsed in 10 mL of sterile double distilled water and re-centrifuged for 5 minutes at 2000 rpm. This process was repeated two more times. After the last wash, 5 mL of supernatant was removed, while the remaining 5 mL of water was mixed with the eggs and placed into a 5 mL Petri dish. The eggs were then placed in an incubator at 25-27° C., and juvenile worms (J2 stage) hatched after about 10 days. The worms were kept in a 25-27° C. incubator for storage.

B) Preparation of Testing Solutions and Placement of Nematodes

Lyophilized peptides were dissolved in required amounts in double distilled water to get required concentrations.

100 μL of the peptide solutions with required concentrations were pipetted into 30 wells of a 96 well plate and one worm was transferred into each well from a stock of extracted J2 *M. incognita*. For a negative control, 30 worms were placed in 100 μL of sterile double distilled water for each experiment.

C) Monitoring Nematodes

The bioassay is designed to test the ability of the peptides, and chalcones, to kill the worms (% mortality). Each test was performed in a 96-well plate with one nematode in each well (30 wells total). The nematodes were incubated in the treatment solutions for 5 days. Viability of the nematodes was tested under a dissecting microscope by examining each for movement after disturbance with a probe.

Example 2—Efficacy of Nematicidal Composition Comprising of Combination of Nematicidal Peptides As depicted in FIG. 1, incubation of J2 stage juvenile nematodes in water caused around 10-20% death of nematodes on Day 5 which served as a negative control. Incubation of juvenile nematodes with Peptide 2, Peptide 3, or Peptide 12 alone at a concentration of 0.8 mg/ml resulted in around 60-66% death of juvenile nematodes on Day 5. However, the nematicidal composition comprising of a combination of 3.0 Peptide 2 and Peptide 3, Peptide 2 and Peptide 12, or Peptide 3 and Peptide 12 in a ratio of 1:1 resulted in nearly 100% death of juvenile nematodes on Day 5, wherein the total concentration of the peptides was 0.8 mg/ml. Moreover, the combination of Peptide 2, 3, and 12 in a ratio of 1:1:1 also resulted in 100% death of juvenile nematodes on Day 5.

These results suggest that the peptides derived from CED-4 protein work synergistically as a nematicidal composition when combined together.

---

We claim:

1. A synergistic composition for controlling nematodes consisting of at least two peptides derived from CED-4 protein, wherein said peptides are selected from the group consisting of SEQ ID NO: 2, SEQ ID NO: 3 and SEQ ID NO: 4:
    wherein the ratio of the peptides in the composition is 1:1 or 1:1:1,
    and wherein the composition has a synergistic anti-nematode efficacy of 100% on *M. incognita* mortality rate at a total peptide concentration of about 0.8 mg/ml.

2. The composition as claimed in claim 1, wherein, the composition comprises SEQ ID NO: 2.

3. The composition as claimed in claim 1, wherein, the composition comprises SEQ ID NO: 3.

4. The composition as claimed in claim 1, wherein, the composition comprises SEQ ID NO: 4.

5. The composition as claimed in claim 1, wherein the composition further comprises at least one extender, an emulsifier and/or surfactant.

6. The composition as claimed in claim 1, wherein the composition further comprises at least one agrochemically active compound selected from fungicides, bactericides, insecticides, acaricides, nematicides, molluscicides, safeners, plant growth regulators, plant nutrients and biological control agents.

7. The composition as claimed in claim 1, wherein the composition comprises a peptide consisting of the amino acid sequence of SEQ ID NO: 4 and a peptide consisting of the amino acid sequence of SEQ ID NO: 2, wherein the ratio of the peptides in the composition is 1:1; and wherein the composition has synergistic anti-nematode efficacy on *M. incognita* mortality rate at a total peptide concentration of about 0.8 mg/ml.

8. The composition as claimed in claim 1, wherein the composition comprises a peptide consisting of the amino acid sequence of SEQ ID NO: 4 and a peptide consisting of the amino acid sequence of SEQ ID NO: 3, wherein the ratio of the peptides in the composition is 1:1; and wherein the composition has synergistic anti-nematode efficacy on *M. incognita* mortality rate at a total peptide concentration of about 0.8 mg/ml.

9. The composition as claimed in claim 1, wherein the composition comprises a peptide consisting of the amino acid sequence of SEQ ID NO: 2 and a peptide consisting of the amino acid sequence of SEQ ID NO: 3, wherein the ratio of the peptides in the composition is 1:1; and wherein the composition has synergistic anti-nematode efficacy on *M. incognita* mortality rate at a total peptide concentration of about 0.8 mg/ml.

10. The composition as claimed in claim 1, wherein the composition comprises a peptide consisting of the amino acid sequence of SEQ ID NO: 4, a peptide consisting of the amino acid sequence of SEQ ID NO: 2 and a peptide consisting of the amino acid sequence of SEQ ID NO: 3, wherein the ratio of the peptides in the composition is 1:1:1; and wherein the composition has synergistic anti-nematode efficacy on *M. incognita* mortality rate at a total peptide concentration of about 0.8 mg/ml.

11. The Composition as claimed in claim 1, wherein the composition consists of two peptides each having a concentration of 0.4 mg/ml.

\* \* \* \* \*